(12) United States Patent
Azizi et al.

(10) Patent No.: US 12,456,331 B2
(45) Date of Patent: Oct. 28, 2025

(54) GUIDED CoModGaN OPTIMIZATION

(71) Applicant: ADOBE INC., San Jose, CA (US)

(72) Inventors: Zohreh Azizi, Los Angeles, CA (US);
Surabhi Sinha, San Jose, CA (US);
Siavash Khodadadeh, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 477 days.

(21) Appl. No.: 18/053,641

(22) Filed: Nov. 8, 2022

(65) Prior Publication Data

US 2024/0152757 A1 May 9, 2024

(51) Int. Cl.
*G06V 40/16* (2022.01)
*G06T 5/77* (2024.01)

(52) U.S. Cl.
CPC .............. *G06V 40/172* (2022.01); *G06T 5/77* (2024.01)

(58) Field of Classification Search
CPC ................................ G06V 40/172; G06T 5/77
See application file for complete search history.

(56) References Cited

U.S. PATENT DOCUMENTS

| 2018/0260984 | A1 | 9/2018 | Severenuk et al. | |
| 2021/0142032 | A1* | 5/2021 | Kim | G06F 18/2413 |
| 2022/0004875 | A1* | 1/2022 | Koike-Akino | G06N 3/045 |
| 2022/0237744 | A1 | 7/2022 | Kwon et al. | |
| 2023/0104262 | A1* | 4/2023 | Lin | G06T 7/11 |
| | | | | 382/173 |
| 2023/0162023 | A1* | 5/2023 | Koike Akino | G06N 3/0455 |
| | | | | 706/25 |
| 2023/0229892 | A1* | 7/2023 | Biswas | G06N 3/0455 |
| | | | | 704/500 |
| 2023/0289984 | A1* | 9/2023 | Reaungamornrat | G06T 7/11 |
| 2023/0344962 | A1* | 10/2023 | Tran | H04N 7/0127 |
| 2024/0127504 | A1* | 4/2024 | Melnik | G06T 11/206 |
| 2025/0200374 | A1* | 6/2025 | Graef | G06N 3/045 |

FOREIGN PATENT DOCUMENTS

| CN | 112215353 A | 1/2021 |
| CN | 114549373 A | 5/2022 |
| CN | 116912083 A | 10/2023 |

(Continued)

OTHER PUBLICATIONS

Zhou et al, UNet++: A Nested U-Net Architecture for Medical Image Segmentation, Jul. 18, 2018 (Year: 2018).*

(Continued)

*Primary Examiner* — Kevin Ky
(74) *Attorney, Agent, or Firm* — F. CHAU & ASSOCIATES, LLC

(57) ABSTRACT

Methods for image processing are described. Embodiments of the present disclosure identifies an image generation network that includes an encoder and a decoder; prunes channels of a block of the encoder; prunes channels of a block of the decoder that is connected to the block of the encoder by a skip connection, wherein the channels of the block of the decoder are pruned based on the pruned channels of the block of the encoder; and generates an image using the image generation network based on the pruned channels of the block of the encoder and the pruned channels of the block of the decoder.

16 Claims, 17 Drawing Sheets

(56) References Cited

FOREIGN PATENT DOCUMENTS

WO 2022126333 6/2022

OTHER PUBLICATIONS

Berrar, D. P., Dubitzky, W., & Granzow, M. (Eds.), (2003), A practical approach to microarray data analysis (pp. 15-19), New York: Kluwer academic publishers, Access on the internet at https://link.springer.com/book/10.1007/b0101875.

Dastjerdi, et al., "Guided Co-Modulated GAN for 360 {\deg} Field of View Extrapolation", arXiv preprint arXiv:2204.07286, 2022, 18 pages.

He, et al., "Channel Pruning for Accelerating Very Deep Neural Networks", In Proceedings of the IEEE international conference on computer vision, (2017), (pp. 1389-1397).

Karras, et al., "Analyzing and Improving the Image Quality of StyleGAN", In Proceedings of the IEEE/CVF conference on computer vision and pattern recognition, (2020), (pp. 8110-8119).

Malik, et al., "Low-Rank Tucker Decomposition of Large Tensors Using TensorSketch", Advances in neural information processing systems, 31, (2018), 11 pages.

Zhao, et al., "Large Scale Image Completion Via Co-Modulated Generative Adversarial Networks", arXiv preprint arXiv:2103.10428v1 [cs.CV] Mar. 18, 2021, 25 pages.

Combined Search and Examination Report dated Feb. 20, 2024 in corresponding Great Britain Patent Application No. 2313454.7 (7 pages).

* cited by examiner

Before Channel Pruning  1300

Pruning 1305

After Channel Pruning  1310

GUIDED CoModGaN OPTIMIZATION

BACKGROUND

The following relates generally to digital image processing using machine learning. Image processing refers to the use of a computer to process a digital image using an algorithm or processing network. Some common use of image processing may include image enhancement, restoration, completion, compression, etc. In some examples, an image is modified using an image editing software. For example, image editing software may be used to anonymize a face depicted in a digital image to obtain an anonymized image.

Machine learning models are used in image generation such as generative adversarial network (GAN) and variations of GAN. However, conventional models involve high computational burden and memory usage and are difficult to implement on mobile devices. Therefore, there is a need in the art for an improved image processing system that is optimized in terms of inference time and memory usage (e.g., model size).

SUMMARY

The present disclosure describes systems and methods for image processing. Embodiments of the present disclosure include an image processing apparatus configured to generate an output image using an optimized image generation network. The optimized image generation network is obtained by applying channel pruning, tensor decomposition, or both, to an image generation network (e.g., CoMod-GAN). In some examples, a pruning component of the image processing apparatus prunes channels of a block of encoder of a synthesis network. The pruning component also prunes channels of a block of a decoder at the same resolution as the block of the encoder, where the block of the decoder is connected to the block of the encoder by a skip connection.

A method, apparatus, and non-transitory computer readable medium for image processing are described. One or more embodiments of the method, apparatus, and non-transitory computer readable medium include identifying an image generation network that includes an encoder and a decoder; pruning channels of a block of the encoder; pruning channels of a block of the decoder that is connected to the block of the encoder by a skip connection, wherein the channels of the block of the decoder are pruned based on the pruned channels of the block of the encoder; and generating an image using the image generation network based on the pruned channels of the block of the encoder and the pruned channels of the block of the decoder.

A method, apparatus, and non-transitory computer readable medium for image processing are described. One or more embodiments of the method, apparatus, and non-transitory computer readable medium include identifying an image generation network; performing tensor decomposition on a layer of the image generation network; compressing the layer of the image generation network based on the tensor decomposition; and generating an image using the image generation network based on the compressed layer.

An apparatus and method for image processing are described. One or more embodiments of the apparatus and method include a processor; a memory including instructions executable by the processor; an image generation network including an encoder and a decoder; a pruning component configured to prune channels of a block of the encoder and to prune channels of a block of the decoder that is connected to the block of the encoder by a skip connection, wherein the channels of the block of the decoder are pruned based on the pruned channels of the block of the encoder; and a training component configured to fine-tune the image generation network based on the pruned channels of the block of the encoder and the pruned channels of the block of the decoder.

DETAILED DESCRIPTION

Figure 1:
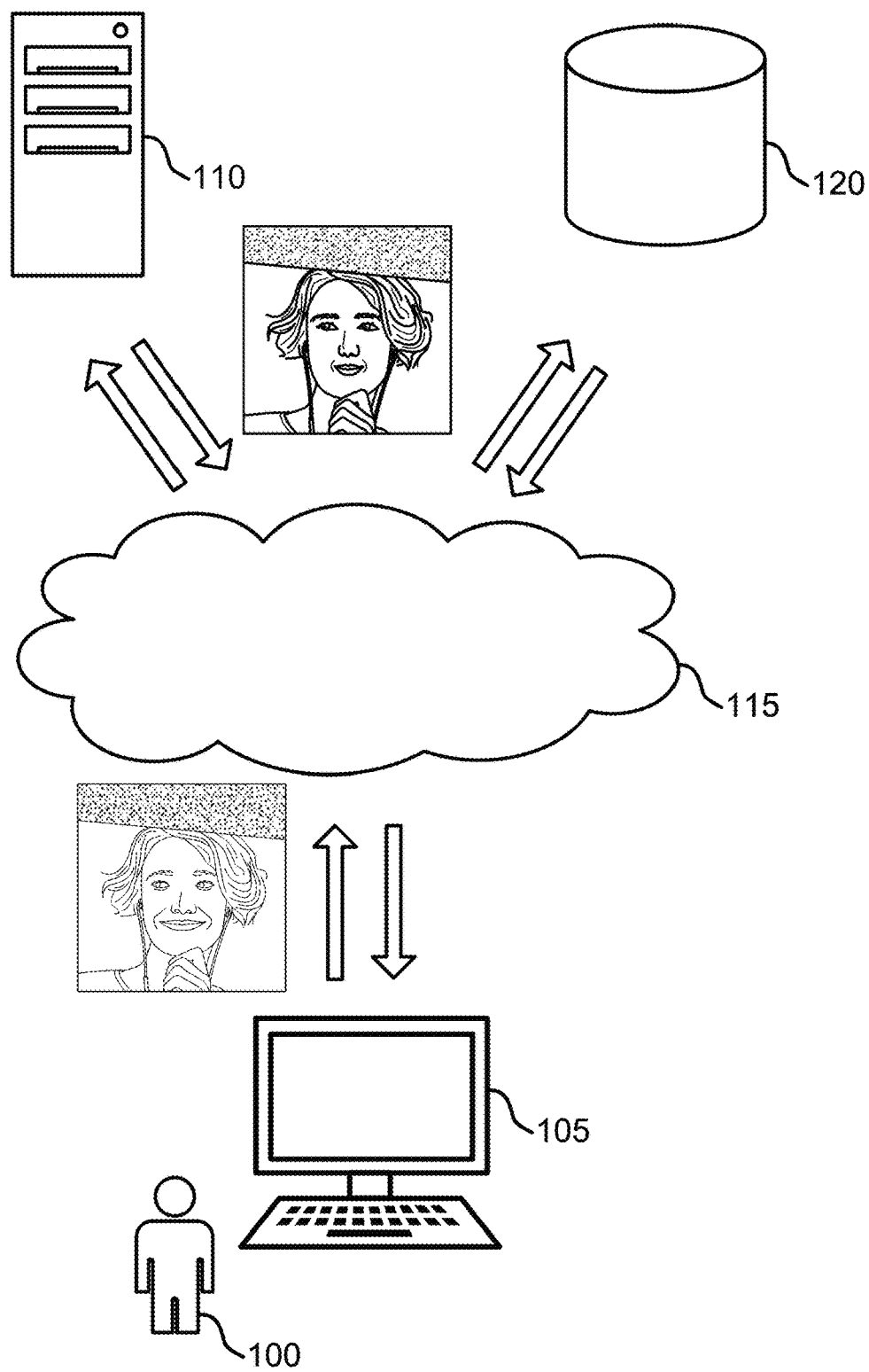
FIG. 1 shows an example of an image processing system according to embodiments of the present disclosure.

The present disclosure describes systems and methods for image processing. Embodiments of the present disclosure include an image processing apparatus configured to generate an output image using an optimized image generation network. The optimized image generation network is obtained by applying channel pruning, tensor decomposition, or both, to an image generation network (e.g., CoMod-GAN). In some examples, a pruning component of the image processing apparatus prunes channels of a block of encoder of a synthesis network. The pruning component also prunes channels of a block of a decoder at the same resolution as the block of the encoder, where the block of the decoder is connected to the block of the encoder by a skip connection.

In some embodiments, the image processing apparatus applies tensor decomposition on a layer of the image generation network and compresses the layer of the image generation network based on the tensor decomposition to obtain the optimized image generation network.

Recently, image processing models are used in tasks such as image enhancement, restoration, completion, or compression. Image processing models can generate an output image based on text or an original image. For example, an image generation model takes a real image as input and generates an anonymized image where the face of a person looks different from the face of the person depicted in the real image. Generative models such as generative adversarial network (GAN) and co-modulated GAN (CoModGAN) are used in face anonymization, However, these conventional models involve high computational cost and memory usage. These conventional models cannot be implemented on mobile devices that have limited memory and processing speed.

Embodiments of the present disclosure include an image processing apparatus configured to optimize an image generation network using channel pruning and tensor decomposition, or both, to obtain an optimized image generation network. In some cases, the optimized image generation network may be referred to as an output model. In some examples, the image generation network includes CoModGAN. The image generation network includes a mapping network and a synthesis network. The synthesis network further includes an encoder and a decoder.

A pruning component of the image processing apparatus is configured to prune channels of a block of the encoder at a certain resolution (e.g., resolution 1024). The pruning component prunes channels of a block of the decoder at the same resolution having an inter-layer connection. For example, the block of the decoder is connected to the block of the encoder by a skip connection.

In some embodiments, a decomposition component of the image processing apparatus is configured to apply tensor decomposition on a layer of an image generation network and to compress the layer of the image generation network based on the tensor decomposition to reduce model size while preserving important features of an image. For example, tensor decomposition involves a singular value decomposition (SVD) and is applied on a weight matrix of each fully-connected layer in a neural network to generate tensors. In some cases, tensor decomposition is applied to convolutional layers of kernel size 1 (e.g., 1×1 convolutional layers). In some examples, tucker decomposition is applied to convolutional layer of kernel size greater than one (e.g., 3×3 convolutional layers). Tucker decomposition is a type of tensor decomposition in which two SVDs are applied on a tensor instead of one SVD. Accordingly, tensor decomposition and tucker decomposition lead to a high compression rate while preserving image quality.

By using the unconventional steps of channel pruning and tensor decomposition on a GAN-based image generation network, model size (e.g., Guided CoModGAN) is reduced by more than 60% for GPU cloud deployment and more than 70% for CPU Cloud deployment. Optimization and compression methods described in the present disclosure lead to two times faster inference time (latency) on GPU and four times faster inference time on CPU. Embodiments of the present disclosure are not limited to CoModGAN. Embodiments of the present disclosure are applicable to other generative models.

Embodiments of the present disclosure may be used in the context of image editing applications. For example, an image processing apparatus based on the present disclosure takes a real image and generates an anonymized image more efficiently (e.g., less inference time and less memory consumption). An example application in the image processing context is provided with reference to FIGS. 8-9. Details regarding the architecture of an example image processing system are provided with reference to FIGS. 1-7. Details regarding the process of image processing are provided with reference to FIGS. 8-16. Example training processes are described with reference to FIG. 17.

Network Architecture

In FIGS. 1-7, an apparatus and method for image processing are described. One or more embodiments of the apparatus and method include a processor; a memory including instructions executable by the processor; an image generation network including an encoder and a decoder; a pruning component configured to prune channels of a block of the encoder and to prune channels of a block of the decoder that is connected to the block of the encoder by a skip connection, wherein the channels of the block of the decoder are pruned based on the pruned channels of the block of the encoder; and a training component configured to fine-tune the image generation network based on the pruned channels of the block of the encoder and the pruned channels of the block of the decoder.

In some embodiments, the image generation network comprises a generative adversarial network (GAN). In some embodiments, the image generation network comprises a co-modulated GAN (CoModGAN). In some embodiments, the image generation network includes a synthesis network and a mapping network, and where the synthesis network includes the encoder and the decoder.

Some examples of the apparatus and method further include a decomposition component configured to perform tensor decomposition on a layer of the image generation network and to compress the layer of the image generation network based on the tensor decomposition.

FIG. 1 shows an example of an image processing system according to embodiments of the present disclosure. The example shown includes user 100, user device 105, image processing apparatus 110, cloud 115, and database 120. Image processing apparatus 110 is an example of, or includes aspects of, the corresponding element described with reference to FIG. 2.

As an example shown in FIG. 1, user 100 uploads an image. The image is transmitted to image processing apparatus 110, e.g., via user device 105 and cloud 115. In this example, the original image includes a face of a lady smiling (a real image). Image processing apparatus 110 is configured to prune channels of a synthesis network of a base model (e.g., CoModGAN) to obtain an output model (e.g., an optimized image generation model). In some examples, image processing apparatus 110 prunes channels of an encoder block and a decoder block at a certain resolution (e.g., resolution 1024), where the encoder block and the decoder block have an inter-layer connection (e.g., a skip connection).

Additionally or alternatively, image processing apparatus 110 performs tensor decomposition and tucker decomposition with regard to the base model to obtain the output model (e.g., the optimized image generation model). Image processing apparatus 110 performs tensor decomposition on a layer of an image generation network and compresses the layer to reduce model size while preserving important features of an input image. Image processing apparatus 110 generates an anonymized image using the optimized image generation model. In this example, the anonymized image includes an identity of a face of a lady that is different than the original image. For example, age, skin color, and gender remain unchanged. The only change is the person's identity (i.e., the output image does not represent the same person in the original image). The anonymized image is transmitted to user 100, e.g., via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 includes a computer implemented network comprising an image generation network, a pruning component, and a decomposition component. Image processing apparatus 110 also includes a processor unit, a memory unit, an I/O module, and a training component. The training component is used to train a machine learning model (e.g., an image generation network or a classifier). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 1-7. Further detail regarding the operation of image processing apparatus 110 is provided with reference to FIGS. 8-16.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by user 100. The term cloud is sometimes used to describe data centers available to many users (e.g., user 100) over the Internet. Some large cloud networks have functions distributed over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

In some examples, image processing apparatus 110 can be implemented on electronic devices (e.g., low storage electronic devices) and cloud-related devices. For example, image processing apparatus 110 can convert an optimized Guided CoModGAN to Open Neural Network Exchange® ("ONNX®") for on-device deployment, to OpenVino™ for CPU cloud deployment, and to TensorRT™ for GPU Cloud deployment.

Figure 2:
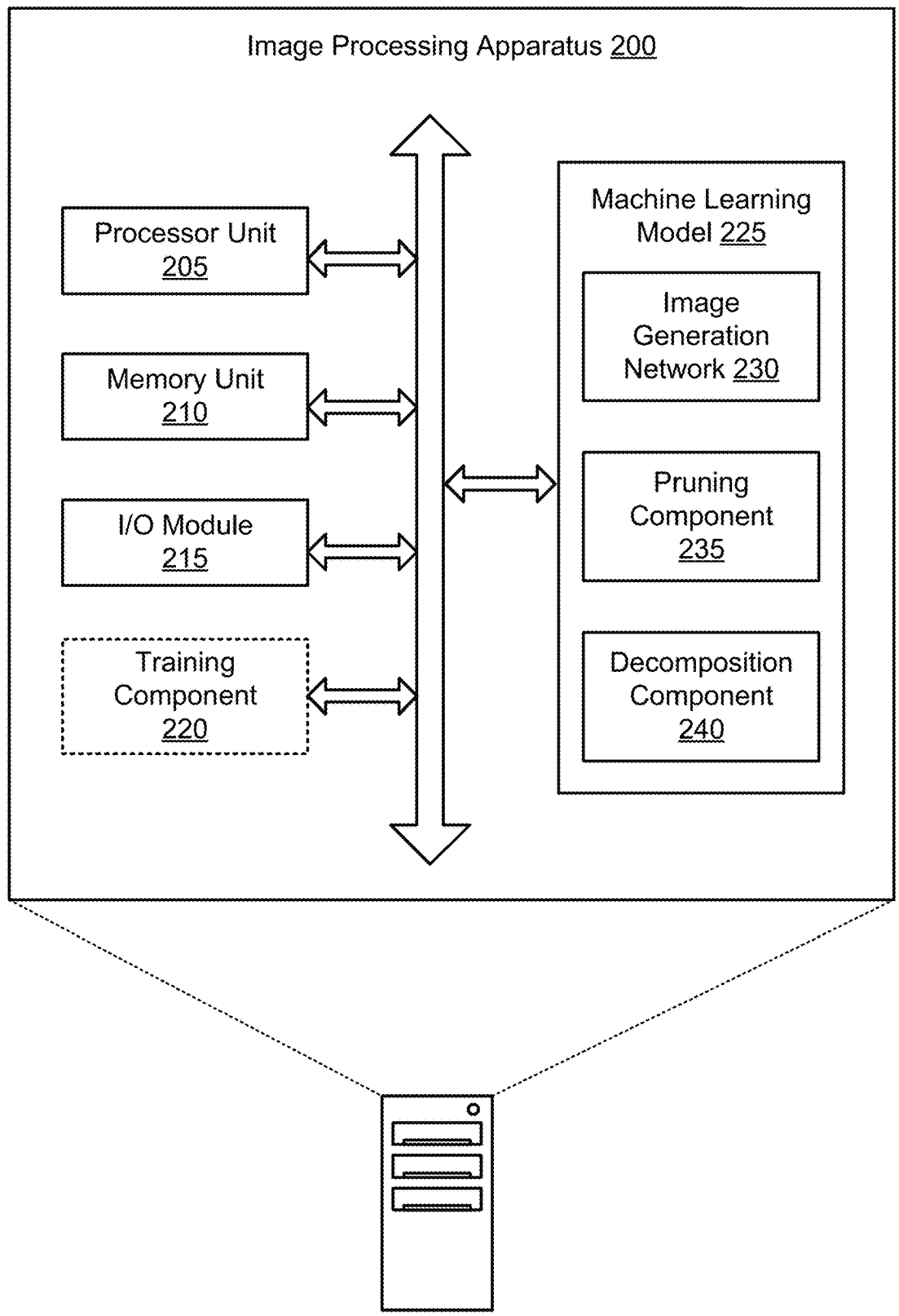
FIG. 2 shows an example of an image processing apparatus according to embodiments of the present disclosure.

FIG. 2 shows an example of an image processing apparatus 200 according to embodiments of the present disclosure. The example shown includes image processing apparatus 200, processor unit 205, memory unit 210, I/O module 215, training component 220, and machine learning model 225. In some embodiments, machine learning model 225 includes image generation network 230, pruning component 235, and decomposition component 240. Image processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing.

Memory unit 210 comprise a memory including instructions executable by processor unit 205. Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 200 includes a computer-implemented convolutional neural network (CNN). CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 220 fine-tunes the image generation network 230 based on the pruned channels of the block of the encoder and the pruned channels of the block of the decoder. In some examples, training component 220 is part of another apparatus other than image processing apparatus 200.

According to some embodiments, machine learning model 225 includes image generation network 230, pruning component 235, and decomposition component 240. Machine learning model 225 identifies image generation network 230 that includes an encoder and a decoder.

According to some embodiments, image generation network 230 generates an image based on the pruned channels of the block of the encoder and the pruned channels of the block of the decoder. In some examples, image generation network 230 identifies an input image and a portion of the input image for inpainting. In some examples, image generation network 230 is used to inpaint the portion of the input image to obtain an inpainted image. In some examples, image generation network 230 identifies an image of a face. In some examples, image generation network 230 generates an anonymized image of the face. In some embodiments, the block of the encoder and the block of the decoder of the image generation network 230 include one or more convolutional layers.

According an embodiment, image generation network 230 generates an image based on the compressed layer. According to some embodiments, image generation network 230 includes an encoder and a decoder. In some embodiments, image generation network 230 includes a generative adversarial network (GAN). In some embodiments, image generation network 230 includes a co-modulated GAN (CoModGAN). In some embodiments, the image generation network 230 includes a synthesis network and a mapping network, and where the synthesis network includes the encoder and the decoder.

According to some embodiments, pruning component 235 prunes channels of a block of the encoder. In some examples, pruning component 235 prunes channels of a block of the decoder that is connected to the block of the encoder by a skip connection, where the channels of the block of the decoder are pruned based on the pruned channels of the block of the encoder.

According to some embodiments, pruning component 235 refrains from pruning a mapping network of image generation network 230, where the encoder and the decoder are components of a synthesis network of image generation network 230. In some examples, pruning component 235 refrains from pruning a global encoder block of the encoder and a global decoder block of the decoder.

According to some embodiments, pruning component 235 prunes channels of a first layer of the block of the encoder. In some examples, pruning component 235 prunes channels of a second layer of the block of the encoder based on the pruned channels of the first layer of the block of the encoder. In some examples, pruning component 235 prunes channels of a first layer of the block of the decoder based on the pruned channels of the first layer of the block of the encoder. In some examples, pruning component 235 prunes channels of a second layer of the block of the decoder based on the pruned channels of the second layer of the block of the encoder.

According to some embodiments, pruning component 235 is configured to prune channels of a block of the encoder and to prune channels of a block of the decoder that is connected to the block of the encoder by a skip connection, wherein the channels of the block of the decoder are pruned based on the pruned channels of the block of the encoder.

According to some embodiments, decomposition component 240 performs tensor decomposition on a layer of image generation network 230. In some examples, decomposition component 240 compresses the layer of image generation network 230 based on the tensor decomposition. In some examples, the tensor decomposition on the layer of image generation network 230 includes singular value decomposition (SVD). In some examples, decomposition component 240 applies the SVD to a convolutional layer of kernel one and to a fully-connected layer of image generation network 230. In some examples, decomposition component 240 identifies a first threshold value, where the SVD is applied based on the first threshold value. In some examples, decomposition component 240 applies tucker decomposition to a convolutional layer of kernel greater than one. In some examples, decomposition component 240 identifies a second threshold value, where the tucker decomposition is applied based on the second threshold value.

According to some embodiments, decomposition component 240 is configured to perform tensor decomposition on a layer of image generation network 230 and to compress the layer of image generation network 230 based on the tensor decomposition.

The described methods may be implemented or performed by devices that include a general-purpose processor, a digital signal processor (DSP), an application-specific integrated circuit (ASIC), a field programmable gate array (FPGA) or other programmable logic devices, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
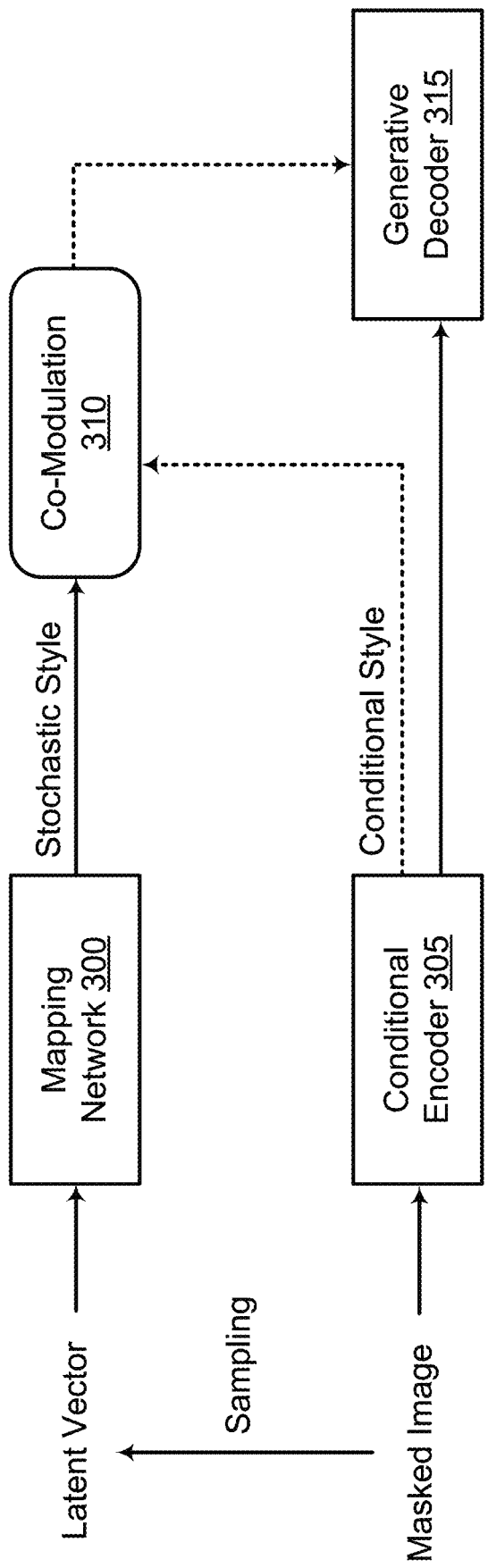
FIG. 3 shows an example of an image generation model according to embodiments of the present disclosure.

FIG. 3 shows an example of an image generation model according to embodiments of the present disclosure. The example shown includes mapping network 300, conditional encoder 305, co-modulation 310, and generative decoder 315. CoModGAN generates diverse and consistent contents not only for small-scale inpainting but also for large-scale image completion by embedding both conditional and stochastic style representations. Conditional style representation is a type of learned styled representations embedded from a conditional input to enhance an output. Stochastic style representation is used for large-scale image completion and is able to produce diverse results even when both input image and input mask are fixed.

Referring to FIG. 3, a masked image is sampled into a latent vector. Mapping network 300 receives the latent vector and a stochastic style is applied to the output feature of mapping network 300. Additionally, conditional encoder 305 encodes the masked image and a conditional style is applied to the output feature of conditional encoder 305.

Co-modulation 310 is applied to the output feature of mapping network 300 and the output feature of conditional encoder 305. Output from co-modulation 310 is input to generative decoder 315. In some cases, the image generation model applies co-modulation 310 for large-scale image completion. As a result, both the result from co-modulation 310 and the output feature of conditional encoder 305 are received as inputs to generative decoder 315. In some cases, the image generation model may not apply co-modulation 310 for small-scale image inpainting, and the output feature of conditional encoder 305 is taken as the input to generative decoder 315.

Mapping network 300 is an example of, or includes aspects of, the corresponding element described with reference to FIGS. 4 and 5. Conditional encoder 305 is an example of, or includes aspects of, the corresponding element described with reference to FIG. 4. Generative decoder 315 is an example of, or includes aspects of, the synthesis network described with reference to FIGS. 4, 5, and 12.

An extension of CoModGAN is Guided CoModGAN. Guide CoModGAN takes a "guide" vector along with the input image and mask. Guided CoModGAN controls the content generation by extracting a guide from the original image and filling in the masked areas in the image according to the guide. Guided CoModGAN is used for face anonymization. For example, the Guide CoModGAN may extract information such as age or gender from the input image as the guide. Examples of face anonymization are further described with reference to FIGS. 8-9.

Figure 4:
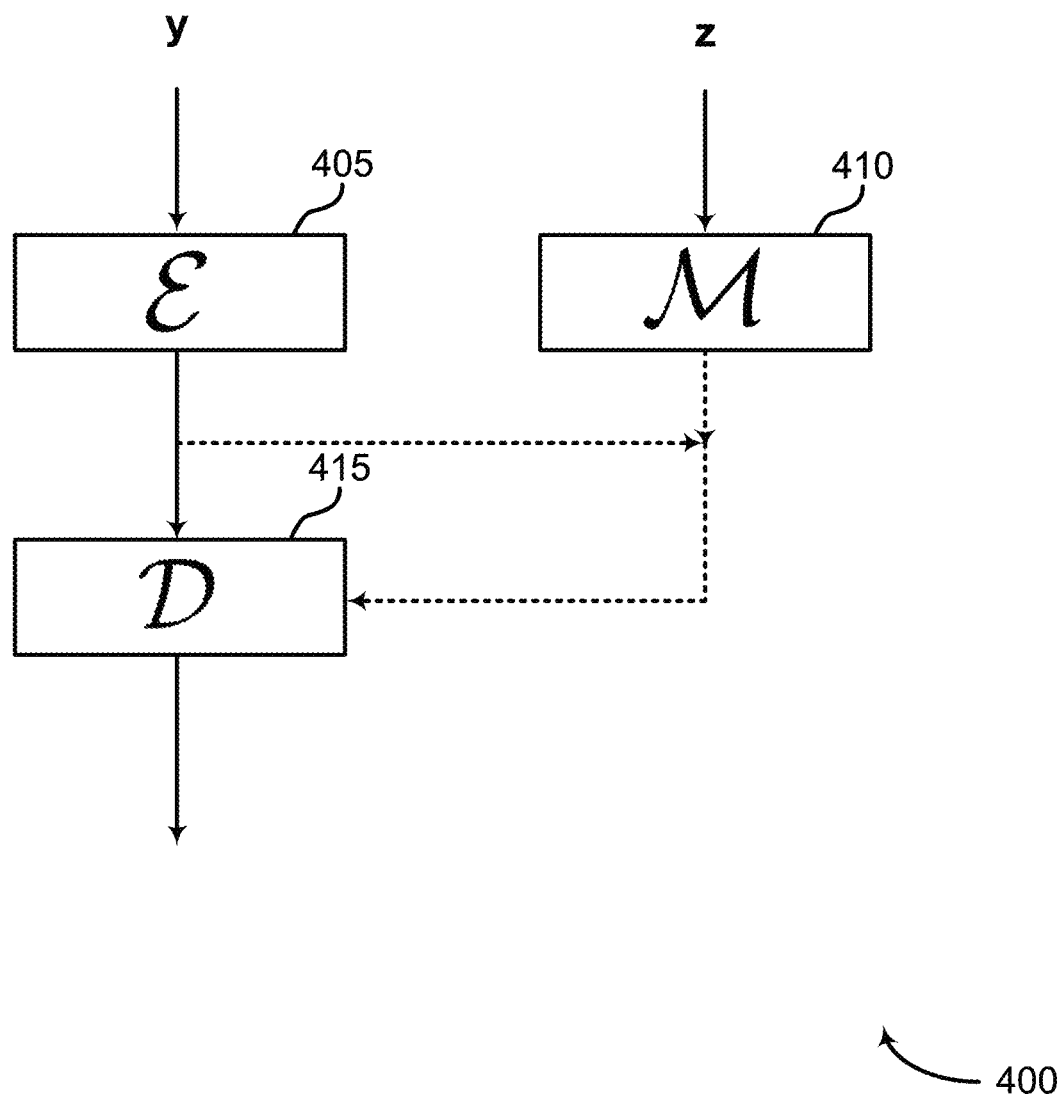
FIG. 4 shows an example of co-modulation according to embodiments of the present disclosure.

FIG. 4 shows an example of co-modulation according to embodiments of the present disclosure. The example shown includes co-modulated generator 400, conditional encoder 405, mapping network 410, and generative decoder 415. Co-modulation combines the generative capability from unconditional modulated generators with the image-conditional generators. Conditional encoder 405 receives input y and generates output feature. A latent vector z is input to mapping network 410 and the mapped latent vector generates a style vector for each subsequent modulation through a learned affined transformation. In some cases, the output feature from conditional encoder 405 and the style vector from mapping network 410 are input into generative decoder 415. In some cases, the output feature from conditional encoder 405 is directly input into generative decoder 415.

Conditional encoder 405 is an example of, or includes embodiments of, the corresponding element described with reference to FIG. 3. Mapping network 410 is an example of, or includes embodiments of, the corresponding element described with reference to FIGS. 3 and 5. Generative decoder 415 is an example of, or includes embodiments of, the corresponding element described with reference to FIG. 3.

Figure 5:
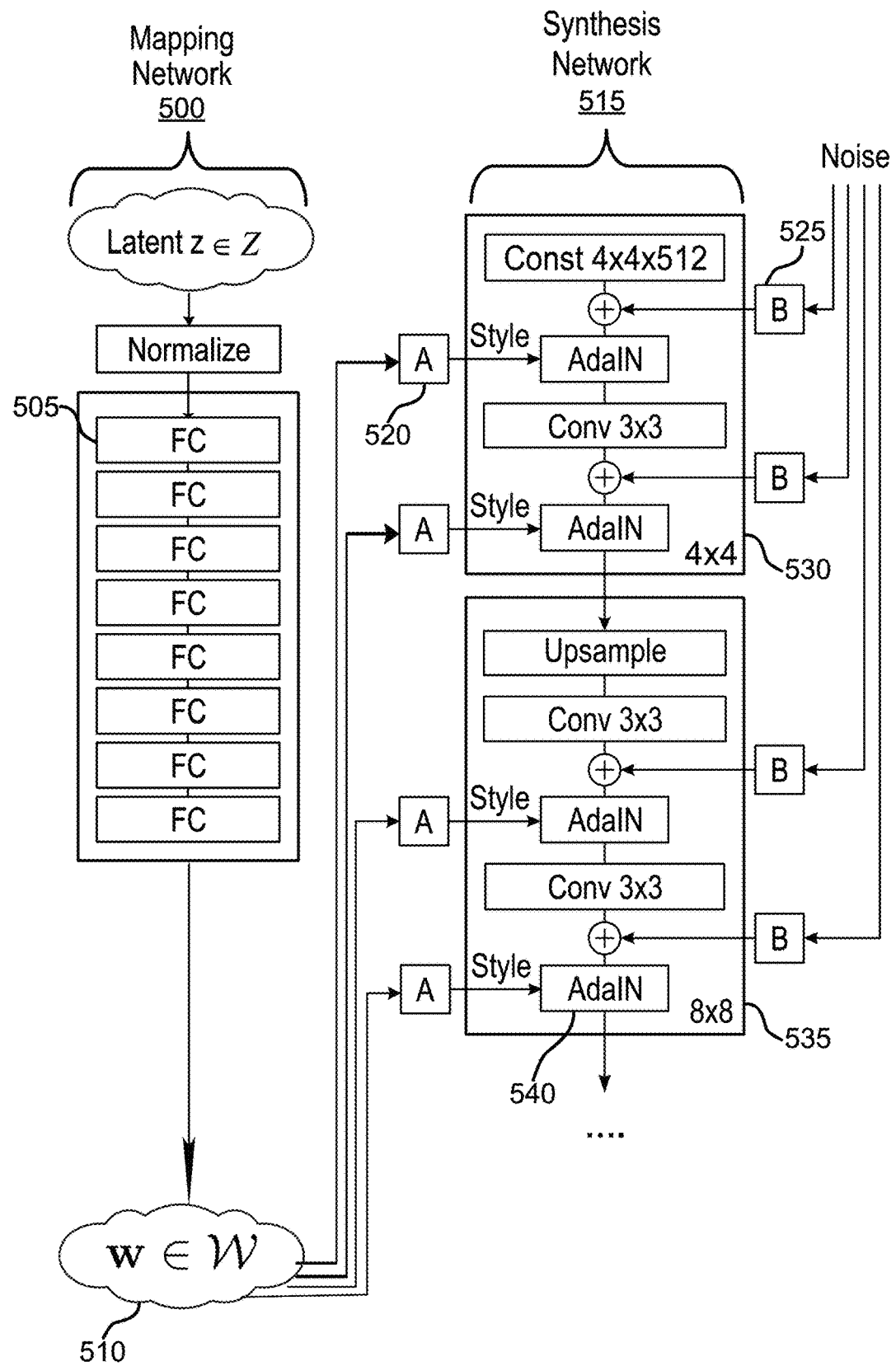
FIG. 5 shows an example of a style-based generator according to embodiments of the present disclosure.

FIG. 5 shows an example of a style-based generator according to embodiments of the present disclosure. The example shown includes mapping network 500, fully connected layer 505, intermediate latent space 510, synthesis network 515, learned affine transform 520, learned per-layer scaling factors 525, first convolutional layer 530, second convolutional layer 535, and adaptive instance normalization 540.

Mapping network 500 is an example of, or includes embodiments of, the corresponding element described with reference to FIGS. 3 and 4. Synthesis network 515 is an example of, or includes embodiments of, the corresponding element described with reference to FIG. 12.

Generative adversarial networks (GANs) are a group of artificial neural networks where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some embodiments, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real.

FIG. 5 shows an example of a style-based generative adversarial networks (StyleGAN). StyleGAN is an extension to the GAN architecture that uses an alternative generator network. StyleGAN includes using a mapping network 500 to map points in latent space to an intermediate latent space 510, using an intermediate latent space 510 to control style at each point, and introducing noise as a source of variation at each point in the generator network.

The mapping network 500 performs a reduced encoding of the original input and the synthesis network 515 generates, from the reduced encoding, a representation as close as possible to the original input.

According to some embodiments, the mapping network 500 includes a deep learning neural network comprised of fully connected layers (e.g., fully connected layer 505). In some cases, the mapping network 500 takes a randomly sampled point from the latent space, such as intermediate latent space 510, as input and generates a style vector as output.

According to some embodiments, the synthesis network 515 includes a first convolutional layer 530 and a second convolutional layer 535. For example, the first convolutional layer 530 includes convolutional layers, such as a cony 3×3, adaptive instance normalization (AdaIN) layers, or a constant, such as a 4×4×512 constant value. For example, the second convolutional layer 535 includes an upsampling layer (e.g., upsample), convolutional layers (e.g., cony 3×3), and adaptive instance normalization (AdaIN) layers.

The synthesis network 515 takes a constant value, for example, a constant 4×4×512 constant value, as input to start the image synthesis process. The style vector generated from the mapping network 500 is transformed by learned affine transform 520 and is incorporated into each block of the synthesis network 515 after the convolutional layers (e.g., cony 3×3) via the AdaIN operation, such as adaptive instance normalization 540. In some cases, the adaptive instance normalization layers can perform the adaptive instance normalization 540. The AdaIN layers first standardizes the output of feature map so that the latent space maps to features in a way so that a randomly selected feature map will result in features that are distributed with a Gaussian distribution, then add the style vector as a bias term. This allows choosing a random latent variable and so that the resulting output will not bunch up. In some cases, the output of each convolutional layer (e.g., cony 3×3) in the synthesis network 515 is a block of activation maps. In some cases, the upsampling layer doubles the dimensions of input (e.g., from 4×4 to 8×8) and is followed by another convolutional layer(s) (e.g., third convolutional layer).

According to some embodiments, Gaussian noise is added to each of these activation maps prior to the adaptive instance normalization 540. A different noise sample is generated for each block and is interpreted using learned per-layer scaling factors 525. In some embodiments, the Gaussian noise introduces style-level variation at a given level of detail.

Figure 6:
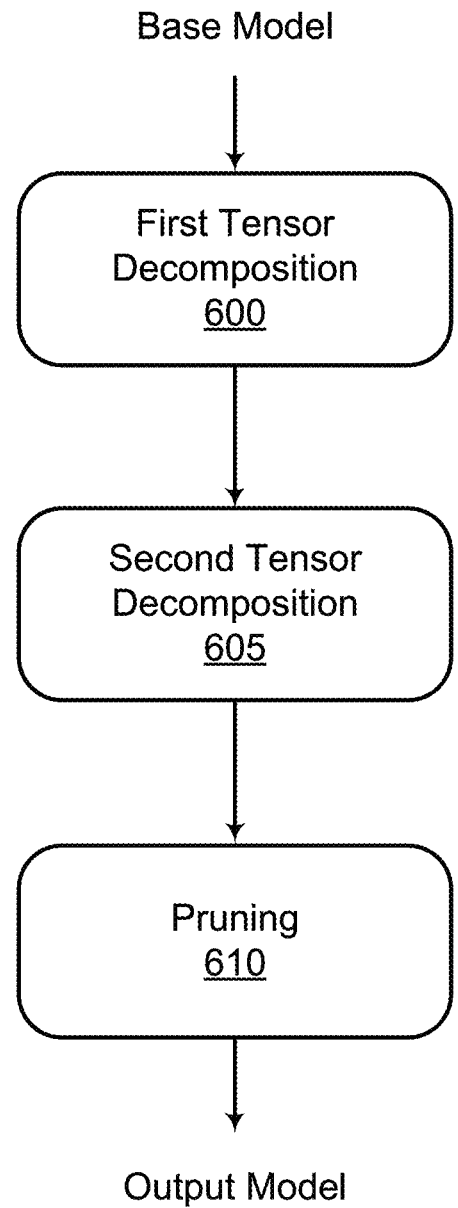
FIG. 6 shows an example of channel pruning according to embodiments of the present disclosure.

FIG. 6 shows an example of channel pruning according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system performs first tensor decomposition based on a base model. In some cases, the operations of this step refer to, or may be performed by, a decomposition component as described with reference to FIG. 2.

In some embodiments, the base model is a trained Guided CoModGAN model. Machine learning model 225 as shown in FIG. 2 performs tensor decomposition on fullyconnected ("FC") layers with regard to the base model. In some cases, tensor decomposition is applied to the FC layers in the mapping network and one or more convolutional operators in the decoder blocks in the synthesis network. This way, the model size is reduced by 20%. In some cases, tensor decomposition includes a singular value decomposition ("SVD"). SVD may be applied to the weight matrix of each FC layer (e.g., a tensor) to decompose it into two tensors. SVD sorts the components of a tensor based on the variance, the first components account for a larger amount of the variance, thus they contain the most important information of the tensor. As a result, after SVD decomposition, by keeping a low-rank tensor (e.g., first few components), machine learning model 225 can preserve the most important information within the tensor with fewer parameters. Then, fine-tuning is applied to generate a first preliminary model or "model 1". For example, fine-tuning is applied before applying the second tensor decomposition. However, in some cases, fine-tuning is optional. This operation leads to 20% reduction in model size compared to the size of the base model. Details regarding an example of tensor decomposition is described with reference to FIG. 15.

At operation 605, the system performs second tensor decomposition. In some cases, the operations of this step refer to, or may be performed by, a decomposition component as described with reference to FIG. 2. According to an embodiment, tensor decomposition is applied to the convolutional layers of kernel size 1 (e.g., Conv 1×1) in the first preliminary model (i.e., model 1). For example, these convolutional layers include layers in the global decoder in the synthesis network. In some cases, the tensor decomposition applied to the first preliminary model can be the same as for the tensor decomposition applied to the base model for FC layers. As a result, the model size is reduced by another 20% (a total of 40% reduction up to this point). Fine-tuning is applied to generate a second preliminary model or "model 2." However, in some cases, fine-tuning is optional.

According to an embodiment, the second preliminary model, or model 2, is generated by applying tensor decomposition on FC and Conv 1×1 layers of the base model. The threshold of tensor decomposition applied on FC and Conv 1×1 layers may be set low to keep only rank 1 (e.g., the first component) after SVD. Thus, this leads to the most size reduction possible.

At operation 610, the system performs pruning. In some cases, the operations of this step refer to, or may be performed by, a pruning component as described with reference to FIG. 2. In some embodiments, the pruning component prunes 50% of the channels on the encoder and decoder blocks of resolution 32 to resolution 1024. In some cases, fine-tuning is applied to obtain the output model.

Figure 7:
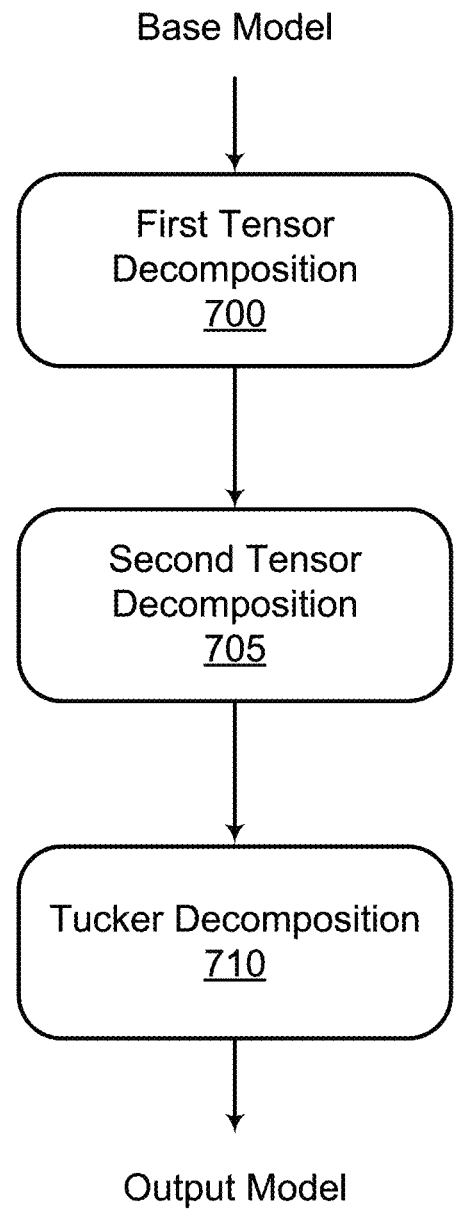
FIG. 7 shows an example of tensor decomposition and tucker decomposition according to embodiments of the present disclosure.

FIG. 7 shows an example of tensor decomposition and tucker decomposition according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system performs first tensor decomposition based on a base model. In some cases, the operations of this step refer to, or may be performed by, a decomposition component as described with reference to FIG. 2. According to an embodiment, machine learning model 225 as shown in FIG. 2 performs tensor decomposition on FC layers of the base model. In some cases, tensor decomposition is applied to the FC layers in the mapping network and one or more convolutional operators in the decoder blocks in the synthesis network. This way, the model size is reduced by 20%. SVD may be applied to the weight matrix of each FC layer (e.g., a tensor) to decompose it into two tensors. SVD sorts the components of a tensor based on the variance, the first components account for a larger amount of the variance, thus they contain the most important information of the tensor. As a result, after SVD decomposition, by keeping a low-rank tensor (e.g., first few components), machine learning model 225 can preserve the most important information within the tensor with fewer parameters. Then, fine-tuning is applied to generate a first preliminary model or "model 1" before applying the second tensor decomposition. However, in some cases, fine-tuning is optional. This operation results in a 20% model size reduction than the size of the base model.

At operation 705, the system performs second tensor decomposition. In some cases, the operations of this step refer to, or may be performed by, a decomposition component as described with reference to FIG. 2. According to an embodiment, tensor decomposition is applied to the convolutional layers of kernel size 1 (e.g., Conv 1×1) in the preliminary model or model 1. For example, these convolutional layers include layers in the global decoder in the synthesis network. In some cases, the tensor decomposition applied to model 1 can be the same as for the tensor decomposition applied to the base model for FC layers. As a result, the model size is reduced by another 20% (a total of 40% reduction up to this point). Then, fine-tuning is applied to generate a second preliminary model or "model 2." However, in some cases, fine-tuning is optional.

According to an embodiment, the second preliminary model is generated by applying tensor decomposition on FC and Conv 1×1 layers of the base model. the threshold of tensor decomposition applied on FC and Conv 1×1 layers may be set low to keep only rank 1 (e.g., only the first component) after SVD. Thus, this results in the most size reduction possible.

At operation 715, the system performs tucker decomposition. In some cases, the operations of this step refer to, or may be performed by, a decomposition component as described with reference to FIG. 2. According to an embodiment, tucker decomposition is applied on convolution layers of kernel size 3 (Conv 3×3) in model 2. Tucker decomposition is applied to layers in the encoder blocks and decoder blocks and the global encoder layers of the synthesis network. Tucker decomposition is a special type of tensor decomposition in which two SVDs are applied on a tensor instead of one SVD. As a result, three tensors are generated instead of two tensors that are generated in tensor decomposition. In some cases, tucker decomposition may be applied on Conv 3×3 layers to generate stable and quality results of a neural network. Then, in some cases, fine-tuning may be applied to obtain an output model. Details regarding an example of tucker decomposition is described with reference to FIG. 16.

In an embodiment, channel pruning and tucker decomposition can be applied to the same base model to generate an optimized output model. For example, channel pruning and tucker decomposition can be applied altogether to optimize the base model.

Image Processing

In FIGS. 8-16, a method, apparatus, and non-transitory computer readable medium for image processing are described. One or more embodiments of the method, apparatus, and non-transitory computer readable medium include identifying an image generation network that includes an encoder and a decoder; pruning channels of a block of the encoder; pruning channels of a block of the decoder that is connected to the block of the encoder by a skip connection, wherein the channels of the block of the decoder are pruned based on the pruned channels of the block of the encoder; and generating an image using the image generation network based on the pruned channels of the block of the encoder and the pruned channels of the block of the decoder.

Some examples of the method, apparatus, and non-transitory computer readable medium further include identifying an input image and a portion of the input image for inpainting. Some examples further include inpainting the portion of the input image using the image generation network to obtain an inpainted image.

Some examples of the method, apparatus, and non-transitory computer readable medium further include identifying an image of a face. Some examples further include generating an anonymized image of the face using the image generation network.

Some examples of the method, apparatus, and non-transitory computer readable medium further include fine-tuning the image generation network based on the pruned channels of the block of the encoder and the pruned channels of the block of the decoder.

Some examples of the method, apparatus, and non-transitory computer readable medium further include refraining from pruning a mapping network of the image generation network, wherein the encoder and the decoder are components of a synthesis network of the image generation network.

Some examples of the method, apparatus, and non-transitory computer readable medium further include refraining from pruning a global encoder block of the encoder and a global decoder block of the decoder. In some examples, the block of the encoder and the block of the decoder include one or more convolutional layers.

Some examples of the method, apparatus, and non-transitory computer readable medium further include pruning channels of a first layer of the block of the encoder. Some examples further include pruning channels of a second layer of the block of the encoder based on the pruned channels of the first layer of the block of the encoder. Some examples further include pruning channels of a first layer of the block of the decoder based on the pruned channels of the first layer of the block of the encoder. Some examples further include pruning channels of a second layer of the block of the decoder based on the pruned channels of the second layer of the block of the encoder.

Additionally or alternatively, one or more embodiments of the method, apparatus, and non-transitory computer readable medium include identifying an image generation network; performing tensor decomposition on a layer of the image generation network; compressing the layer of the image generation network based on the tensor decomposition; and generating an image using the image generation network based on the compressed layer. In some embodiments, the tensor decomposition on the layer of the image generation network comprises singular value decomposition (SVD).

Some examples of the method, apparatus, and non-transitory computer readable medium further include applying SVD to a convolutional layer of kernel one and to a fully-connected layer of the image generation network. Some examples of the method, apparatus, and non-transitory computer readable medium further include identifying a first threshold value, wherein the SVD is applied based on the first threshold value.

Some examples of the method, apparatus, and non-transitory computer readable medium further include applying tucker decomposition to a convolutional layer of kernel greater than one. Some examples of the method, apparatus, and non-transitory computer readable medium further include identifying a second threshold value, wherein the tucker decomposition is applied based on the second threshold value.

Figure 8:
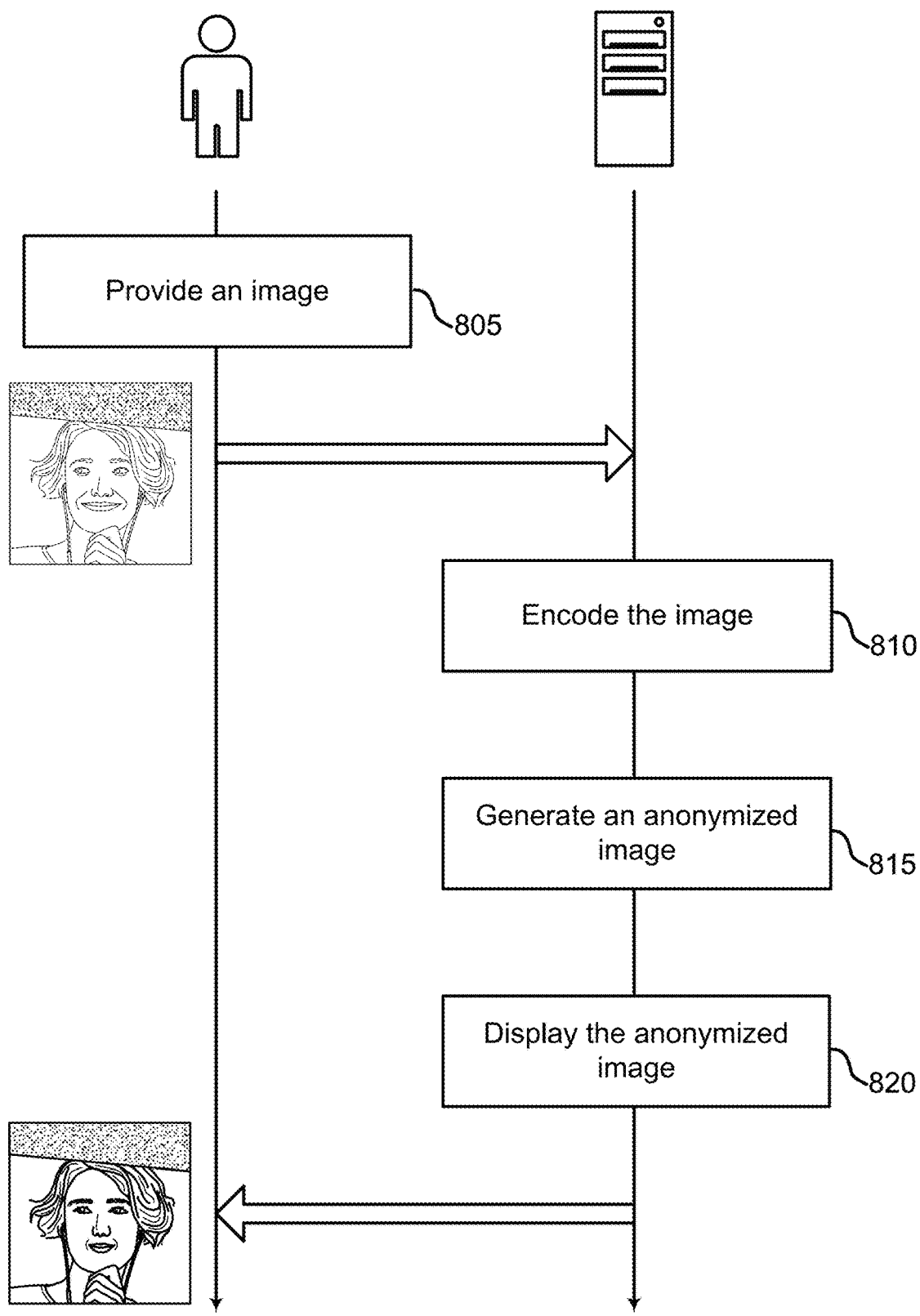
FIG. 8 shows an example of image processing according to embodiments of the present disclosure.

FIG. 8 shows an example of image processing according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with embodiments of the present disclosure. In some cases, the operations described herein are composed of various sub-steps, or are performed in conjunction with other operations.

At operation 805, the user provides an image. In some cases, the operations of this step refer to, or may be performed by, a user as described with reference to FIG. 1. In some cases, for example, a user input one or multiple images depicting a face to the image generation system.

At operation 810, the system encodes the image. In some cases, the operations of this step refer to, or may be performed by, an image processing apparatus as described with reference to FIGS. 1 and 2. In some cases, for example, certain attributes such as gender, age, ethnicity, and expression in the image are kept the same but the identity is changed. In some embodiments, the pruning component of the image processing apparatus performs channel pruning on layers of encoders and layers of decoders of an image generation network. Additionally or alternatively, the decomposition component of the image processing apparatus applies tensor decomposition and tucker decomposition on one or more layers of the image generation network.

At operation 815, the system generates an anonymized image based on the image encoding. In some cases, the operations of this step refer to, or may be performed by, an image processing apparatus as described with reference to FIGS. 1 and 2. In some embodiments, the image processing apparatus generates an anonymized image. In some cases, the image processing system generates anonymized faces that have contextually meaningful features. These features can be the attributes are unchanged.

At operation 820, the system displays the anonymized image to the user. In some cases, the operations of this step refer to, or may be performed by, an image processing apparatus as described with reference to FIGS. 1 and 2. In some embodiments, the image processing apparatus shows the anonymized image to the user via a user interface on a user device.

Figure 9:
FIG. 9 shows an example of image anonymization according to embodiments of the present disclosure.

FIG. 9 shows an example of image anonymization according to embodiments of the present disclosure. The example shown includes real image 900 and anonymized image 905. In the example shown in FIG. 9, real image 900 depicts a face of a boy. Machine learning model 225 as shown in FIG. 2 takes real image 900 as input. In some cases, machine learning model 225 can anonymize the boy's face by changing the boy's mouth from an open, smiling mouth to a closed mouth. In addition, machine learning model 225 anonymizes the boy's face by modifying the boy's eyebrows, eyes, nose, and mouth. Certain attributes including age, skin color, ethnicity, and gender of the boy in the image are unchanged. In some examples, a mask is applied to the boy's face. As a result, regions outside of the mask (e.g., boy's hair and background of the image) remains unchanged. The image anonymization provides some differences between real image 900 and anonymized image 905, such that the person in those images looks similar but not identical. Accordingly, the boy depicted in anonymized image 905 has a different identity than the boy depicted in real image 900 because machine learning model 225 has modified (or anonymized) the identity of the boy.

In another example shown in FIG. 9, a real image 900 depicting a face of a lady is provided to machine learning model 225. Machine learning model 225 anonymizes the lady's face by modifying the lady's eyebrows, eyes, nose, and mouth. For example, the face of the lady in anonymized image 905 shows darker and heavier eyebrow, smaller eyes, narrower nose, and smaller mouth compared to the face of the lady in real image 900. In some cases, the expression (e.g., smile) of the lady depicted in real image 900 remains the same. Certain attributes including age, skin color, ethnicity, and gender of the person are unchanged. Accordingly, the lady depicted in anonymized image 905 has a different identity than the lady depicted in real image 900.

Figure 10:
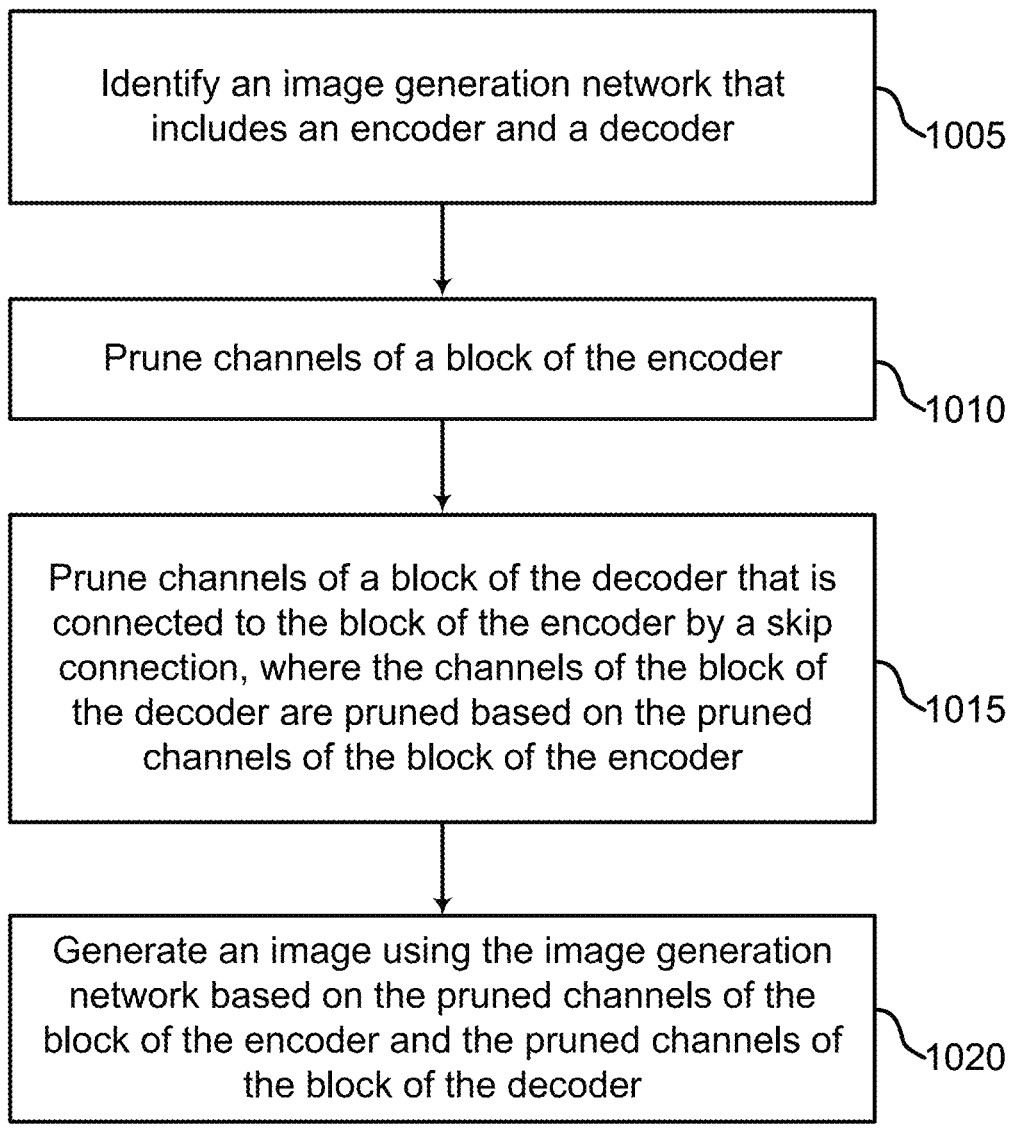
FIG. 10 shows an example of a method for image generation according to embodiments of the present disclosure.

FIG. 10 shows an example of a method for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies an image generation network that includes an encoder and a decoder. In some cases, the operations of this step refer to, or may be performed by, a machine learning model as described with reference to FIG. 2. In some examples, the image generation network is a GAN model such as CoModGAN. CoModGAN includes a mapping network and a synthesis network. The structure of the synthesis network is further described in FIG. 12. The synthesis network includes an encoder and a decoder where a layer of the decoder is connected to a layer of the encoder by a skip connection in a U-net architecture.

At operation 1010, the system prunes channels of a block of the encoder. In some cases, the operations of this step refer to, or may be performed by, a pruning component as described with reference to FIG. 2. The synthesis network includes encoder block and decoder block in a number of resolutions e.g., ranging from 4 to 1024. An encoder block and a decoder block at a certain resolution (e.g., resolution 1024, resolution 512, resolution 256, etc.) have an inter-layer connection. In some cases, 50% of the channels in the block of encoder are pruned to reduce the model size while maintaining important information of input data (e.g., input image).

Figure 12:
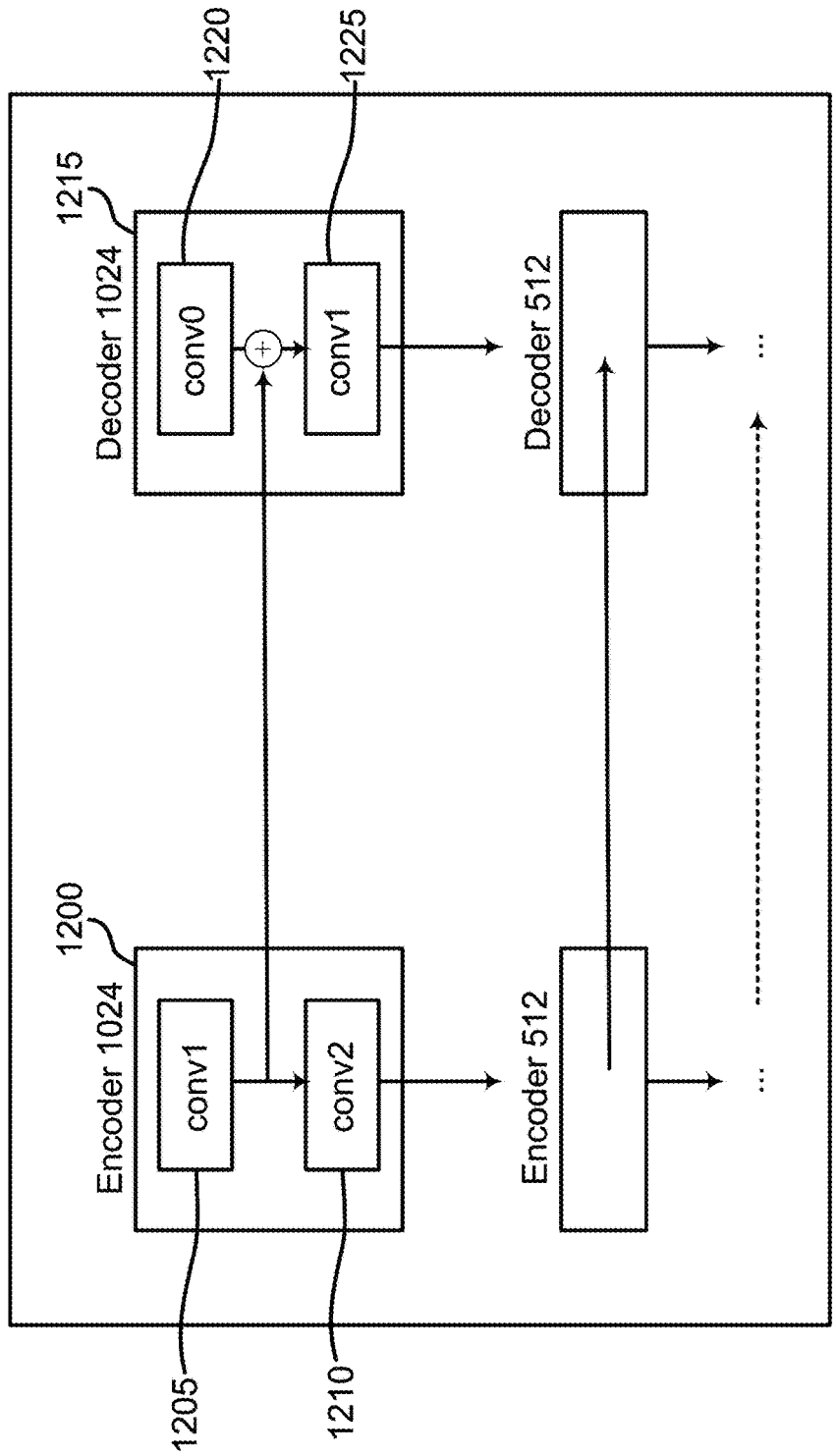
FIG. 12 shows an example of channel pruning of an image generation network according to embodiments of the present disclosure.

According to an embodiment, as an example synthesis network demonstrated in FIG. 12, the output of "conv1" layer of an encoder block at a certain resolution is the input to "conv2" layer in the same encoder block. Additionally, the output of the "conv1" layer in the encoder block is added to the output of the "conv0" layer in the decoder block at the same resolution to obtain a combined output. The combined output is then fed to the "conv1" layer in the decoder block at the same resolution.

During channel pruning, the pruning component prunes 50% of the channels in "conv1" layer of the encoder block at resolution 1024. The pruned channels have the least L-2 norm (e.g., prune channels that are closest to zero). Next, the pruning component prunes the same channels in the input of the "conv2" layer in the same encoder block.

At operation 1015, the system prunes channels of a block of the decoder that is connected to the block of the encoder by a skip connection, where the channels of the block of the decoder are pruned based on the pruned channels of the block of the encoder. In some cases, the operations of this step refer to, or may be performed by, a pruning component as described with reference to FIG. 2. The pruning component prunes the same channels in the output of the "conv0" layer of the decoder block at the same resolution. The pruning component prunes the same channels in the input of the "conv1" layer of the decoder block at the same resolution. In some examples, 50% of channels in the decoder block corresponding to those that were pruned in the encoder block are also pruned to reduce model size.

At operation 1020, the system generates an image using the image generation network based on the pruned channels of the block of the encoder and the pruned channels of the block of the decoder. In some cases, the operations of this step refer to, or may be performed by, an image generation network as described with reference to FIG. 2. In some cases, the image generation network (e.g., optimized output model) generates an output image based on the important information preserved by channel pruning. The inference time to generate an output image according to aspects of the present disclosure is two times faster on GPU and four times faster on CPU.

Figure 11:
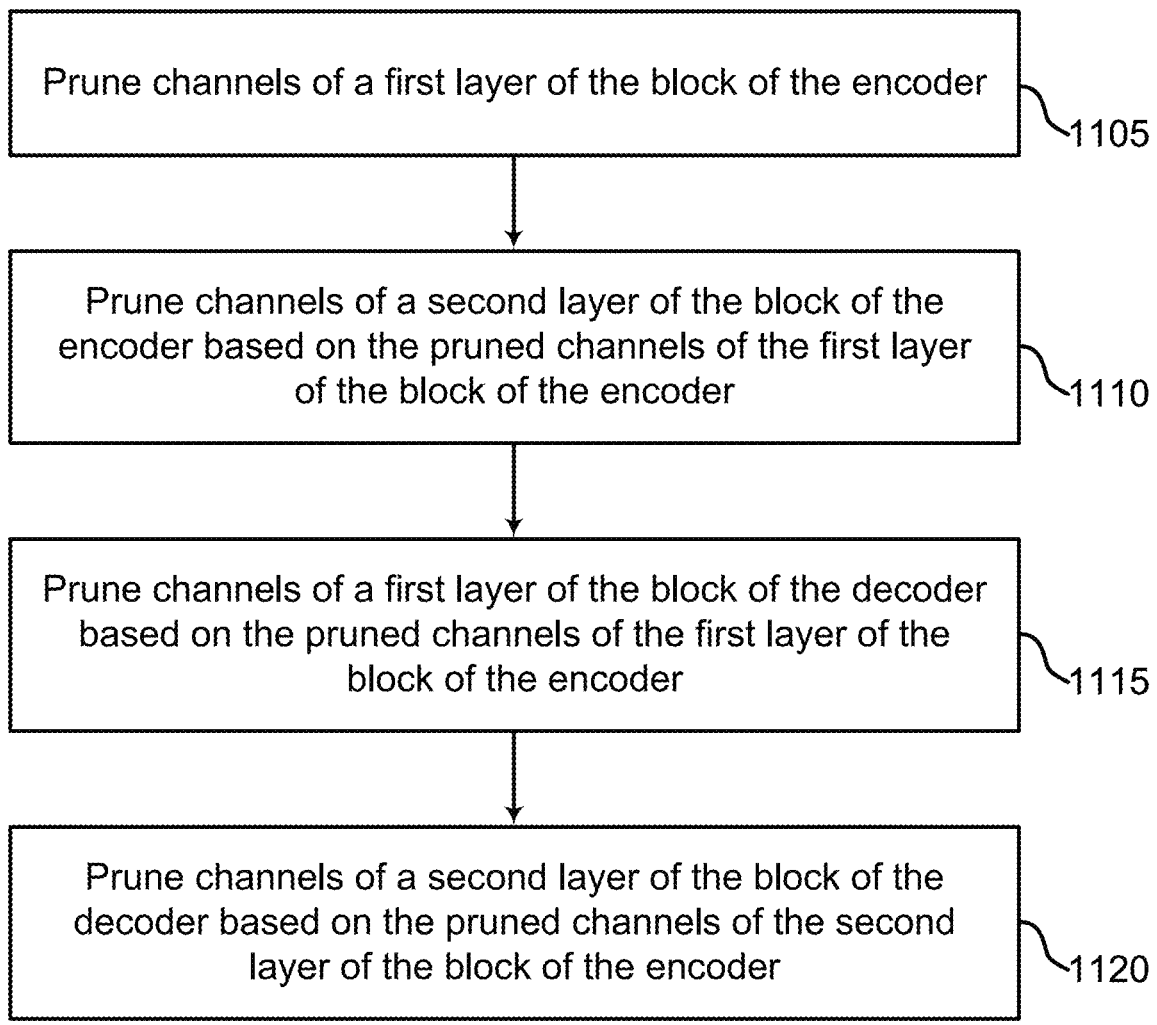
FIG. 11 shows an example of a method for channel pruning according to embodiments of the present disclosure.

FIG. 11 shows an example of a method for channel pruning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system prunes channels of a first layer of the block of the encoder. In some cases, the operations of this step refer to, or may be performed by, a pruning component as described with reference to FIG. 2. In some cases, the Guided CoModGAN has inter-layer connections (see FIG. 12). A customized channel pruning is implemented by pruning the output of the first convolutional layer in the encoder. For example, pruning component 235 as shown in FIG. 2, prunes the output of a first layer of a block of the encoder.

At operation 1110, the system prunes channels of a second layer of the block of the encoder based on the pruned channels of the first layer of the block of the encoder. In some cases, the operations of this step refer to, or may be performed by, a pruning component as described with reference to FIG. 2. Pruning component 235 prunes the following channels accordingly. Pruning component 235 prunes the input of the second convolutional layer in the encoder. For example, pruning component 235 prunes a second encoder layer of the encoder block.

At operation 1115, the system prunes channels of a first layer of the block of the decoder based on the pruned channels of the first layer of the block of the encoder. In some cases, the operations of this step refer to, or may be performed by, a pruning component as described with reference to FIG. 2. Pruning component 235 prunes the output of the first convolutional layer in the decoder (e.g., a first layer of the decoder block).

At operation 1120, the system prunes channels of a second layer of the block of the decoder based on the pruned channels of the second layer of the block of the encoder. In some cases, the operations of this step refer to, or may be performed by, a pruning component as described with reference to FIG. 2. Pruning component prunes a second layer of the decoder block.

According to some embodiments, SVD is applied on fully-connected and 1×1 convolutional layers of the base model. Additionally, the pruning component applies channel pruning on the encoder blocks and decoder blocks of high resolutions. For example, encoder and decoder blocks having high resolutions range from 32 to 1024. Pruning the encoder and decoder blocks of higher resolution can reduce the inference time. Additionally, the encoder and decoder blocks of the lower resolutions (e.g., 4 to 16) contribute more towards the global outline and consistency of the generated images. Therefore, encoder and decoder blocks of resolution 4 to 16 are not modified. Encoder and decoder blocks of resolutions 32 to 1024 are pruned. The machine learning model maintains globally-meaningful generated images and reduces inference time.

The encoder blocks and decoder blocks are connected to each other in CoModGAN (see FIG. 12), encoder and decoder blocks of each resolution are pruned at the same time. Then, in some cases, the training component fine-tunes the output model from channel pruning.

FIG. 12 shows an example of channel pruning of an image generation network according to embodiments of the present disclosure. The example shown includes encoder block 1200, first encoder layer 1205, second encoder layer 1210, decoder block 1215, first decoder layer 1220, second decoder layer 1225, and synthesis network 1230. Synthesis network 1230 is an example of, or includes embodiments of, the corresponding element described with reference to FIG. 5. In some cases, encoder block 1200 may be referred to as a block of the encoder. Accordingly, first encoder layer 1205 may be referred to as a first layer of the block of the encoder. Second encoder layer 1210 may be referred to as a second layer of the block of the encoder. In some cases, decoder block 1215 may be referred to as a block of the decoder. Accordingly, first decoder layer 1220 may be referred to as a first layer of the block of the decoder. Second decoder layer 1225 may be referred to as a second layer of the block of the decoder.

According to an embodiment, CoModGAN includes a mapping network and synthesis network 1230. As shown in FIG. 12, an example of encoder and decoder block at resolution 1024 of synthesis network 1230 is illustrated. Synthesis network 1230 contains encoder and decoder blocks in a number of resolutions e.g., ranging from 4 to 1024. The encoder and decoder blocks in each resolution have inter-layer connections. In some examples, the corresponding channels from encoder and decoder are pruned together to keep skip connections in U-net architecture.

According to an embodiment, first encoder layer 1205 is a convolutional layer (conv 1) in encoder block 1200 at resolution 1024. In some embodiments, the output of first encoder layer 1205 is input to second encoder layer 1210 of encoder block 1200.

According to an embodiment, first decoder layer 1220 is a convolutional layer (conv 0) in decoder block 1215 at resolution 1024. The output of first encoder layer 1205 is added to the output of first decoder layer 1220 to obtain a combined output (e.g., the output coming out of the circled plus sign). The combined output is input to second decoder layer 1225 of decoder block 1215. During channel pruning, pruning component 235 as shown in FIG. 2 prunes 50% of the channels in first encoder layer 1205 of encoder block 1200 at a resolution (e.g., resolution 1024). The channels to be pruned have the least L-2 norm (e.g., channels that are closest to zero are to be pruned).

According to an embodiment, pruning component 235 prunes the same channels in the input of second encoder layer 1210, the same channels in the output of first decoder layer 1220 at the same resolution, and the same channels in second decoder layer 1225 at the same resolution. For example, at resolution 1024, there are 32 channels. Of these 32 channels, channels 1 to 16 have L-2 norm of 0.9 and channels 17 to 32 have L-2 norm of 0.001. As a result, channels 17-32 in the encoder layers (e.g., first encoder layer 1205 and second encoder layer 1210) of encoder block 1200 and the decoder layers (e.g., first decoder layer 1220 and second decoder layer 1225) of the decoder block 1215 are pruned. Thus, pruning component prunes synthesis network 1230 while keeping the architecture consistent with the inter-layer connections.

The pruning component further prunes synthesis network 1230 at lower resolutions (e.g., resolution 512, resolution 256, resolution 128, resolution 64, and resolution 32) in the same way as described above. In some examples, pruning component 235 prunes encoder blocks and decoder blocks of resolutions 32 to 1024 having convolutional layers of kernel size 3.

According to an embodiment, the pruning component prunes channels of a second layer of decoder block 1215 based on the pruning of encoder block 1200. The second layer of encoder block 1200 is pruned based on the first layer of encoder block 1200.

According to an embodiment, pruning component 235 is excluded from pruning the global encoder block/layer and the global decoder block/layer in synthesis network 1230. In some cases, layers in the mapping network are not pruned.

Figure 13:
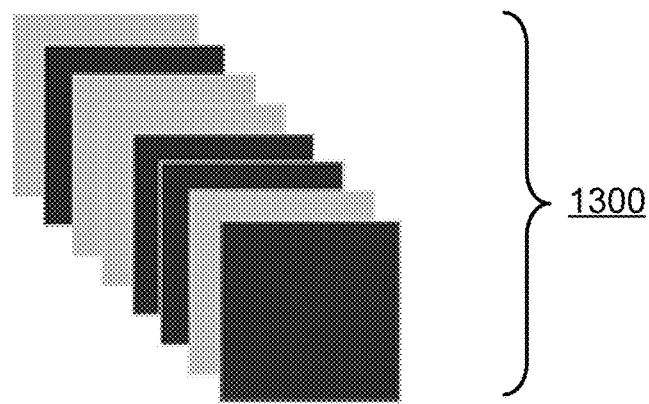
FIG. 13 shows an example of channel pruning according to embodiments of the present disclosure.
Figure 13:
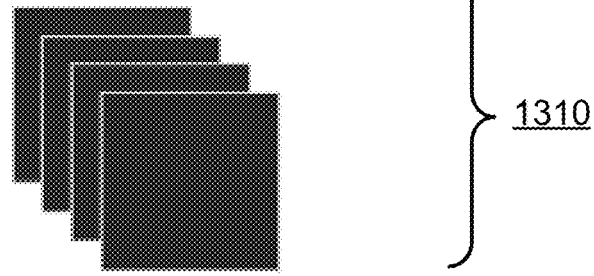

FIG. 13 shows an example of channel pruning according to embodiments of the present disclosure. The example shown includes input layers 1300 and output layers 1310. At operation 1305 (e.g., pruning 1305), the system prunes input layers 1300 to obtain output layers 1310. In some cases, the operations of this step refer to, or may be performed by, a pruning component as described with reference to FIG. 2. For example, input layers 1300 include 8 convolutional layers. After pruning, 50% of input layers 1300 are removed and output layers 1310 includes 4 convolutional layers. The output layers 1310 contains important information of input data. Accordingly, the output model after channel pruning is two times faster in terms of inference time (latency) on GPU and four times faster on CPU.

Figure 14:
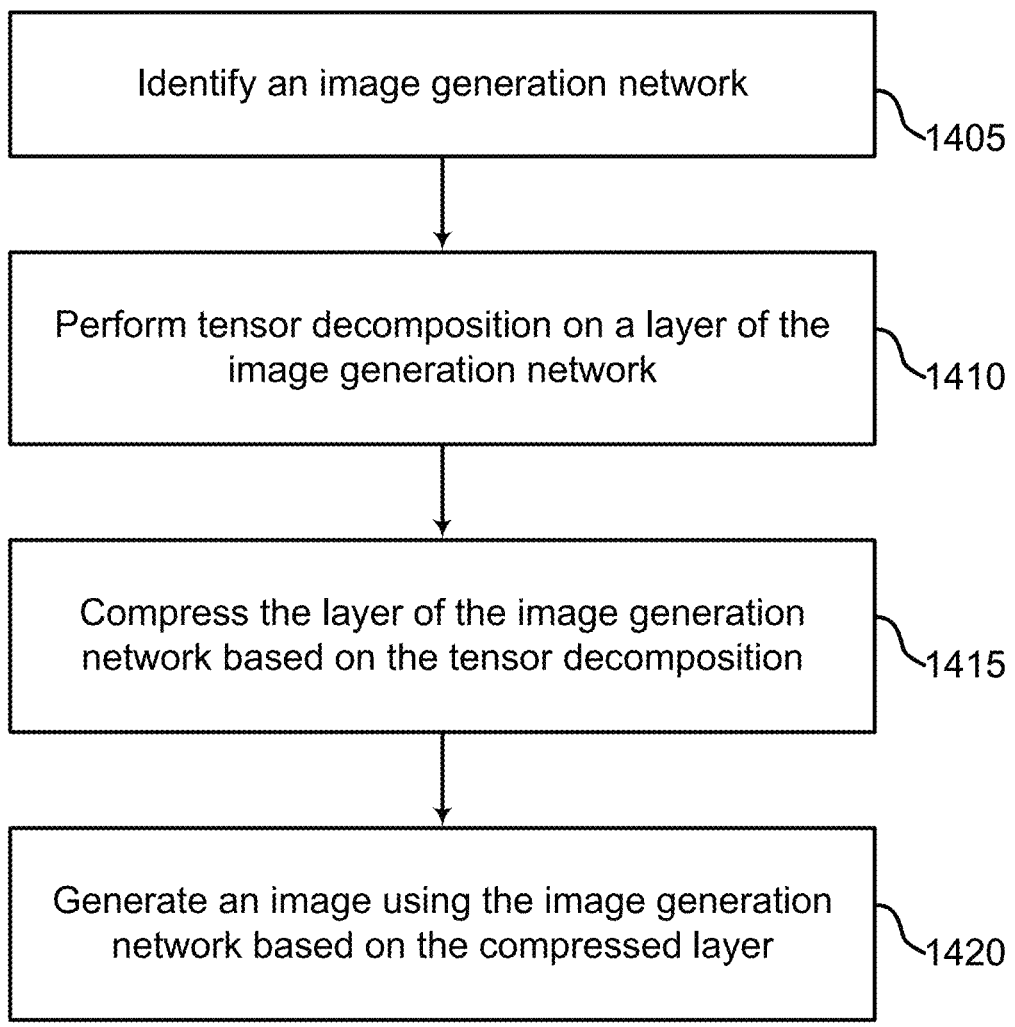
FIG. 14 shows an example of a method for tensor decomposition according to embodiments of the present disclosure.

FIG. 14 shows an example of a method for tensor decomposition according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system identifies an image generation network. In some cases, the operations of this step refer to, or may be performed by, a machine learning model as described with reference to FIG. 2. In some cases, the image generation network includes an encoder and a decoder with a skip connection in a U-net architecture.

At operation 1410, the system performs tensor decomposition on a layer of the image generation network. In some cases, the operations of this step refer to, or may be performed by, a decomposition component as described with reference to FIG. 2. In some cases, SVD is applied to the layer of the image generation network to generate two tensors. In some cases, by keeping a low-rank tensor (or pruning the high-rank tensor) among the two tensors, the most important information within the tensor can be preserved.

At operation 1415, the system compresses the layer of the image generation network based on the tensor decomposition. In some cases, the operations of this step refer to, or may be performed by, a decomposition component as described with reference to FIG. 2. In some examples, the system performs tensor decomposition on fully connected layers and convolutional layers with kernel 1×1 of the image generation network. Further details regarding tensor decomposition are described with reference to FIG. 15.

At operation 1420, the system generates an image using the image generation network based on the compressed layer. In some cases, the operations of this step refer to, or may be performed by, an image generation network as described with reference to FIG. 2. In some examples, the image generation network generates an anonymized image (e.g., an image that includes an anonymized face). Example of an anonymized image generated via the image generation network is described with reference to FIG. 9.

Figure 15:
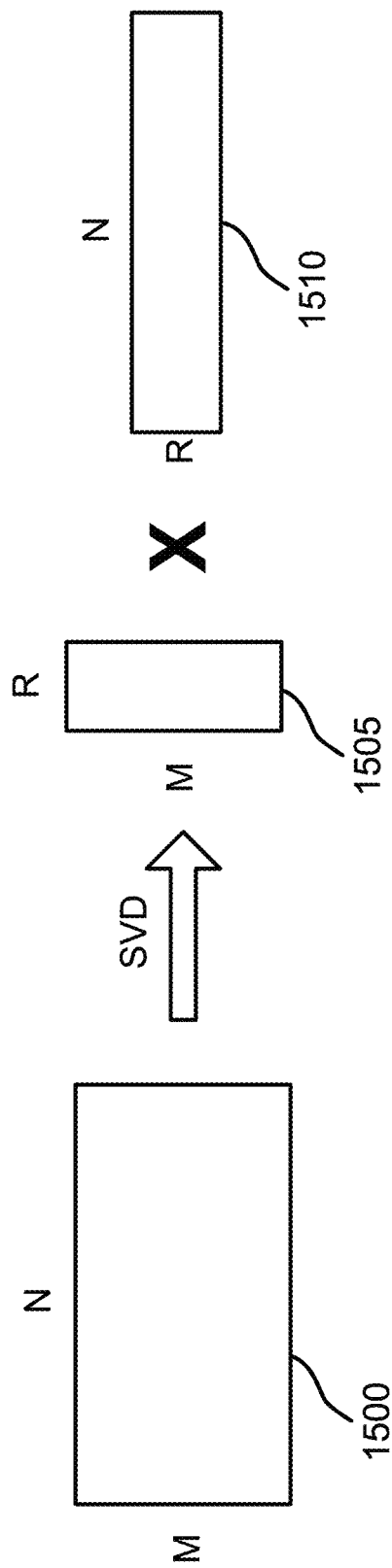
FIG. 15 shows an example of tensor decomposition according to embodiments of the present disclosure.

FIG. 15 shows an example of tensor decomposition according to embodiments of the present disclosure. The example shown includes layer 1500, first tensor 1505, and second tensor 1510. Layer 1500 is an example of, or includes aspects of, the corresponding element described with reference to FIG. 16. First tensor 1505 is an example of, or includes aspects of, the corresponding element described with reference to FIG. 16. Second tensor 1510 is an example of, or includes aspects of, the corresponding element described with reference to FIG. 16.

A tensor is a multi-dimensional array of numerical values and is a generalization of matrices to higher dimensions. Tensor and its decomposition are useful in unsupervised settings. A tensor generated from tensor decomposition contains an entity in a system that interacts with other entities in the system and the value of the tensor changes based on changes in other entities.

Referring to FIG. 15, SVD is applied to layer 1500 having a dimension of M×N. SVD process outputs two tensors (e.g., first tensor 1505 and second tensor 1510). First tensor 1505 is a vector with dimension M×R. Second tensor 1510 is a vector with dimension R× N. In some cases, by keeping a low-rank tensor (first few components), machine learning model 225 as shown in FIG. 2 can preserve the most important information within the tensor with fewer parameters. In some embodiments, the threshold of tensor decomposition applied on FC and Conv 1×1 convolutional layers may be set low to keep only rank 1 (e.g., the first component) after SVD. Thus, this operation results in the most size reduction possible.

Figure 16:
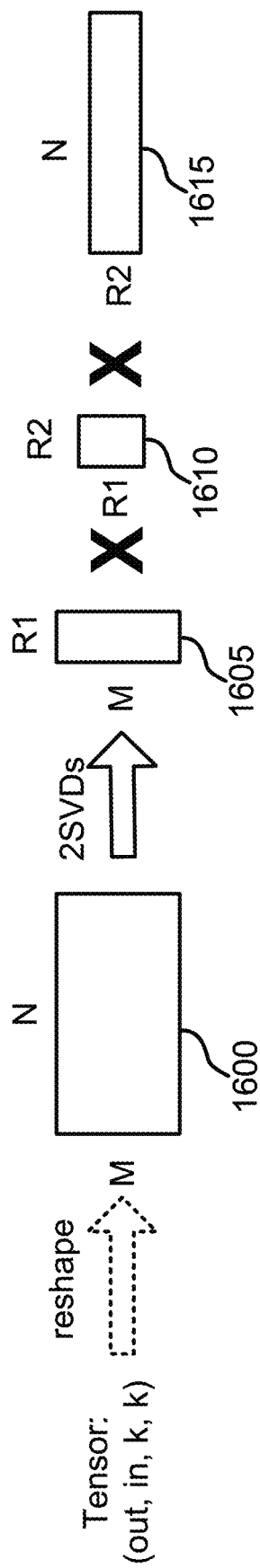
FIG. 16 shows an example of tucker decomposition according to embodiments of the present disclosure.

FIG. 16 shows an example of tucker decomposition according to embodiments of the present disclosure. The example shown includes layer 1600, first tensor 1605, second tensor 1610, and third tensor 1615. Layer 1600 is an example of, or includes aspects of, the corresponding element described with reference to FIG. 15. First tensor 1605 is an example of, or includes aspects of, the corresponding element described with reference to FIG. 15. Second tensor 1610 is an example of, or includes aspects of, the corresponding element described with reference to FIG. 15.

Tucker decomposition is a special type of tensor decomposition in which two SVDs are applied to a tensor instead of one SVD. As a result, three tensors are generated instead of two tensors that are generated from tensor decomposition. In some cases, tucker decomposition may be applied to Conv 3×3 convolutional layers to generate stable and quality results of a neural network.

Referring to FIG. 16, a tensor (e.g., tensor (out, in, k, k)) is reshaped into layer 1600 having dimension M×N. In some examples, the tensor (e.g., tensor (out, in, k, k)) is an output tensor from tensor decomposition. Then, two SVDs are applied to layer 1600, and three tensors are generated. First tensor 1605 is a vector with dimension of M×R1, second tensor 1610 is a vector with dimension R1×R2, and third tensor 1615 is a vector with dimension R2×N.

In some examples, tensor/tucker decomposition are used to compress the model to obtain a "decomposition model" (see FIG. 7). In some examples, tensor decomposition and pruning are used to obtain a "pruning model" (see FIG. 6), the training component is configured to fine-tune the model afterwards. Fine-tuning for the decomposition model and the pruning model are the same. The fine-tuning is compatible with training the Guided Co-Mod-GAN. That is, no parameter needs to be changed at training. The fine-tuned model is then used at inference time.

Training and Evaluation

Figure 17:
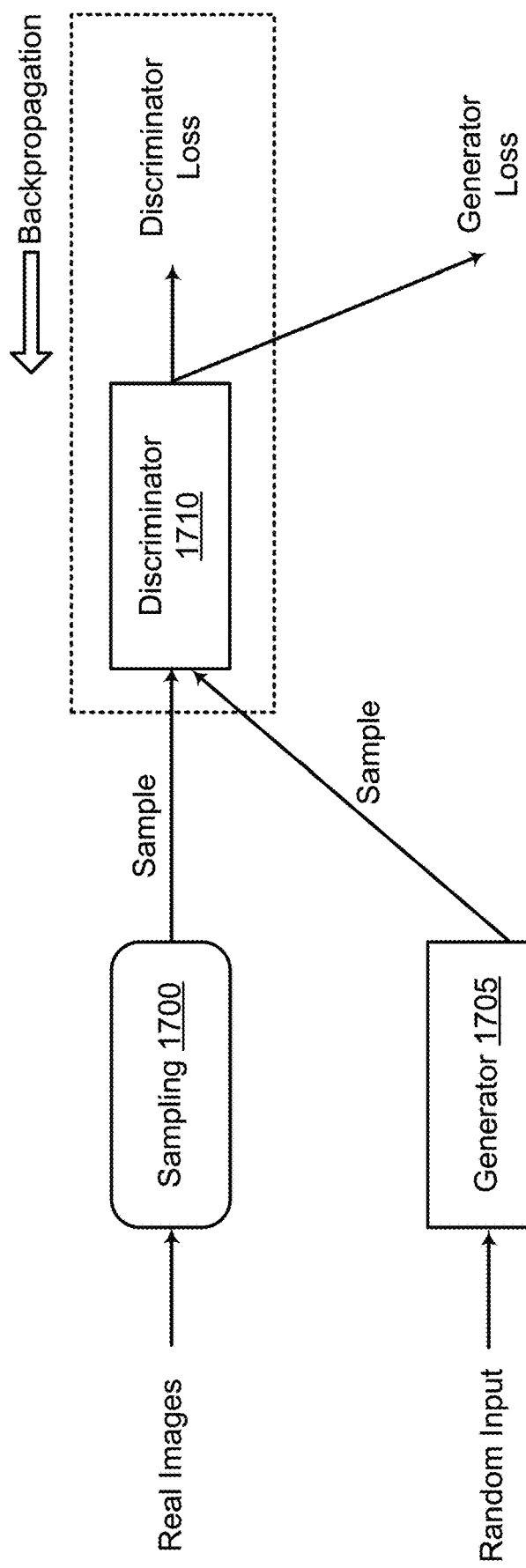
FIG. 17 shows an example of generative adversarial network (GAN) training according to embodiments of the present disclosure.

FIG. 17 shows an example of GAN training according to embodiments of the present disclosure. The example shown includes generator 1705 and discriminator 1710. A GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network, e.g., to produce novel candidates that the discriminator network classifies as real. In training, the generator network generates false data, and the discriminator network learns the false data.

Referring to FIG. 17, at operation 1700 (e.g., sampling 1700), sample (e.g., real data) is generated from real images. The sample generated from the real images is the first input to discriminator 1710. Discriminator 1710 uses the real data as positive examples during training. In some embodiments, the operations of this step refer to, or may be performed by, a training component as described with reference to FIG. 2.

According to an embodiment, generator 1705 receives random input and generates a sample (e.g., false data). The sample generated by generator 1705 is the second input to the discriminator 1710. Discriminator 1710 uses the false data as negative examples during training.

In discriminator training, generator 1705 is not trained. The weights of the generator 1705 remain constant while generator 1705 generates examples (e.g., negative examples) for discriminator 1710. In some embodiments, discriminator 1710 is trained based on a generator loss. First, discriminator 1710 classifies the real data and the false data generated by generator 1705. Then, the discriminator loss is used to penalize discriminator 1710 for misclassifying a real data as false or a false data as real. Next, discriminator 1710 updates the weights of discriminator 1710 through backpropagation from the discriminator loss through discriminator 1710.

GAN training proceeds in alternating periods. For example, discriminator 1710 is trained for one or more epochs and generator 1705 is trained for one or more epochs. The training component continues to train generator 1705 and discriminator 1710 in such a way.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation comprising:
identifying, by a machine learning model, an image generation network that includes an encoder and a decoder;
pruning channels of a first layer of a block of the encoder;
pruning channels of a second layer of the block of the encoder based on the pruned channels of the first layer of the block of the encoder;
pruning channels of a block of the decoder that is connected to the block of the encoder by a skip connection, wherein the channels of the block of the decoder are pruned based on the pruned channels of the block of the encoder;
wherein pruning channels of the block of the decoder comprises:
pruning channels of a first layer of the block of the decoder based on the pruned channels of the first layer of the block of the encoder; and
pruning channels of a second layer of the block of the decoder based on the pruned channels of the second layer of the block of the encoder; and
generating an image using the image generation network based on the pruned channels of the block of the encoder and the pruned channels of the block of the decoder.

2. The method of claim 1, further comprising:
identifying an input image and a portion of the input image for inpainting; and
inpainting the portion of the input image using the image generation network to obtain an inpainted image.

3. The method of claim 1, further comprising:
identifying an image of a face; and
generating an anonymized image of the face using the image generation network.

4. The method of claim 1, further comprising:
fine-tuning the image generation network based on the pruned channels of the block of the encoder and the pruned channels of the block of the decoder.

5. The method of claim 1, further comprising:
refraining from pruning a mapping network of the image generation network, wherein the encoder and the decoder are components of a synthesis network of the image generation network.

6. The method of claim 1, further comprising:
refraining from pruning a global encoder block of the encoder and a global decoder block of the decoder.

7. The method of claim 1, wherein:
the block of the encoder and the block of the decoder comprise convolutional layers.

8. A non-transitory computer readable medium storing code for image processing, the code comprising instructions that, when executed by at least one processor, cause the at least one processor to perform operations for an image generation method comprising:
identifying, by a machine learning model, an image generation network that includes an encoder and a decoder;
pruning channels of a first layer of a block of the encoder;
pruning channels of a second layer of the block of the encoder based on the pruned channels of the first layer of the block of the encoder;
pruning channels of a block of the decoder that is connected to the block of the encoder by a skip connection, wherein the channels of the block of the decoder are pruned based on the pruned channels of the block of the encoder;
wherein pruning channels of the block of the decoder comprises:
pruning channels of a first layer of the block of the decoder based on the pruned channels of the first layer of the block of the encoder; and
pruning channels of a second layer of the block of the decoder based on the pruned channels of the second layer of the block of the encoder; and
generating an image using the image generation network based on the pruned channels of the block of the encoder and the pruned channels of the block of the decoder.

9. The non-transitory computer readable medium of claim 8, the code further comprising instructions executable by the at least one processor to perform operations comprising:
identifying an input image and a portion of the input image for inpainting; and
inpainting the portion of the input image using the image generation network to obtain an inpainted image.

10. The non-transitory computer readable medium of claim 8, the code further comprising instructions executable by the at least one processor to perform operations comprising:
identifying an image of a face; and
generating an anonymized image of the face using the image generation network.

11. The non-transitory computer readable medium of claim 8, the code further comprising instructions executable by the at least one processor to perform operations comprising:
fine-tuning the image generation network based on the pruned channels of the block of the encoder and the pruned channels of the block of the decoder.

12. The non-transitory computer readable medium of claim 8, the code further comprising instructions executable by the at least one processor to perform operations comprising:
refraining from pruning a mapping network of the image generation network, wherein the encoder and the decoder are components of a synthesis network of the image generation network.

13. The non-transitory computer readable medium of claim 8, the code further comprising instructions executable by the at least one processor to perform operations comprising:
refraining from pruning a global encoder block of the encoder and a global decoder block of the decoder.

14. A system for image generation comprising:
a memory component; and
a processing device coupled to the memory component, the processing device configured to perform operations comprising:
identifying, by a machine learning model, an image generation network that includes an encoder and a decoder;
pruning channels of a first layer of a block of the encoder;
pruning channels of a second layer of the block of the encoder based on the pruned channels of the first layer of the block of the encoder;

pruning channels of a block of the decoder that is connected to the block of the encoder by a skip connection, wherein the channels of the block of the decoder are pruned based on the pruned channels of the block of the encoder;

wherein pruning channels of the block of the decoder comprises:
  pruning channels of a first layer of the block of the decoder based on the pruned channels of the first layer of the block of the encoder; and
  pruning channels of a second layer of the block of the decoder based on the pruned channels of the second layer of the block of the encoder; and generating an image using the image generation network based on the pruned channels of the block of the encoder and the pruned channels of the block of the decoder.

15. The system of claim 14, wherein:
the image generation network includes a synthesis network and a mapping network, and wherein the synthesis network includes the encoder and the decoder.

16. The system of claim 14, further comprising:
a decomposition component configured to perform tensor decomposition on a layer of the image generation network and to compress the layer of the image generation network based on the tensor decomposition.

* * * * *